Figure 1:
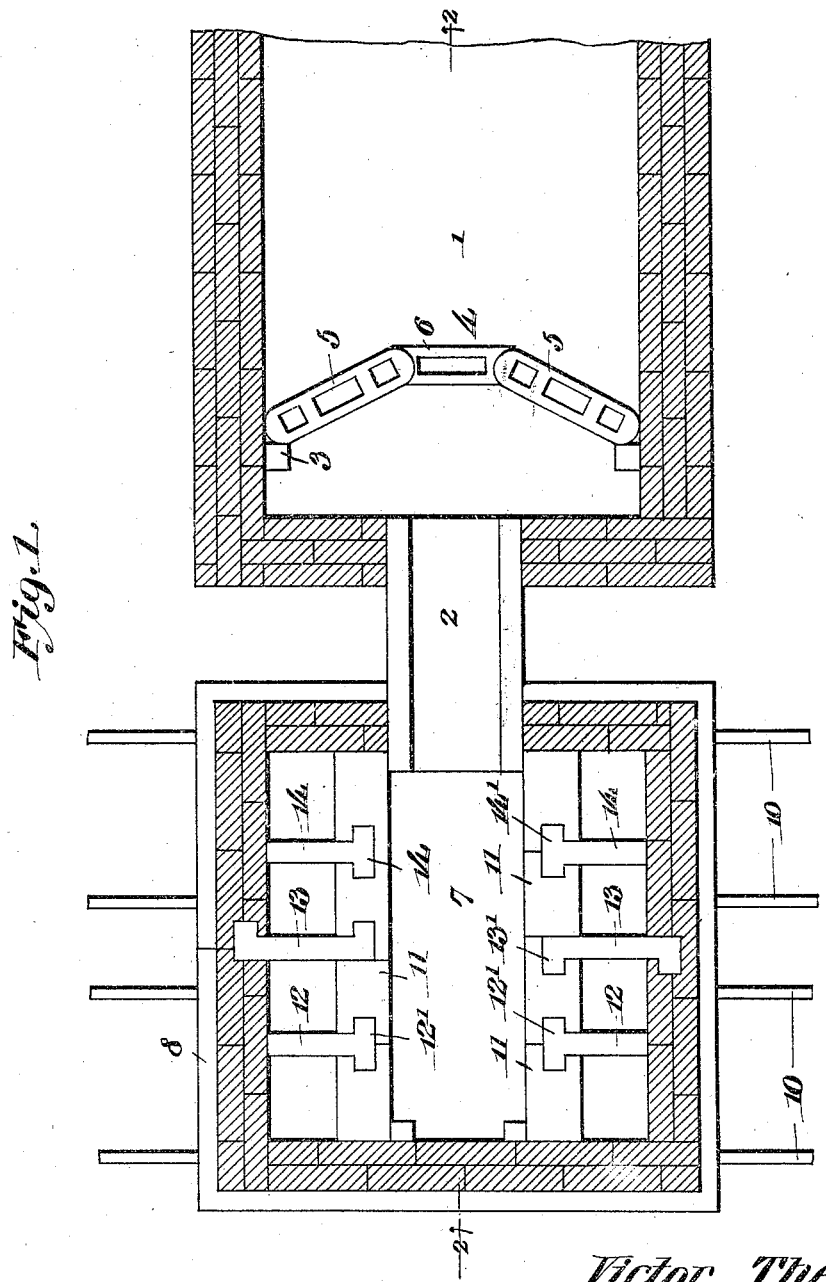

V. THENIS.
GLASS FURNACE.
APPLICATION FILED MAY 28, 1911.

1,027,933.

Patented May 28, 1912.

3 SHEETS—SHEET 1.

Witnesses
[signature]
R. B. Cavanagh.

Inventor
Victor Thenis.

By Victor J. Evans
Attorney

V. THENIS.
GLASS FURNACE.
APPLICATION FILED MAY 26, 1911.
1,027,933.
Patented May 28, 1912.
3 SHEETS—SHEET 2.
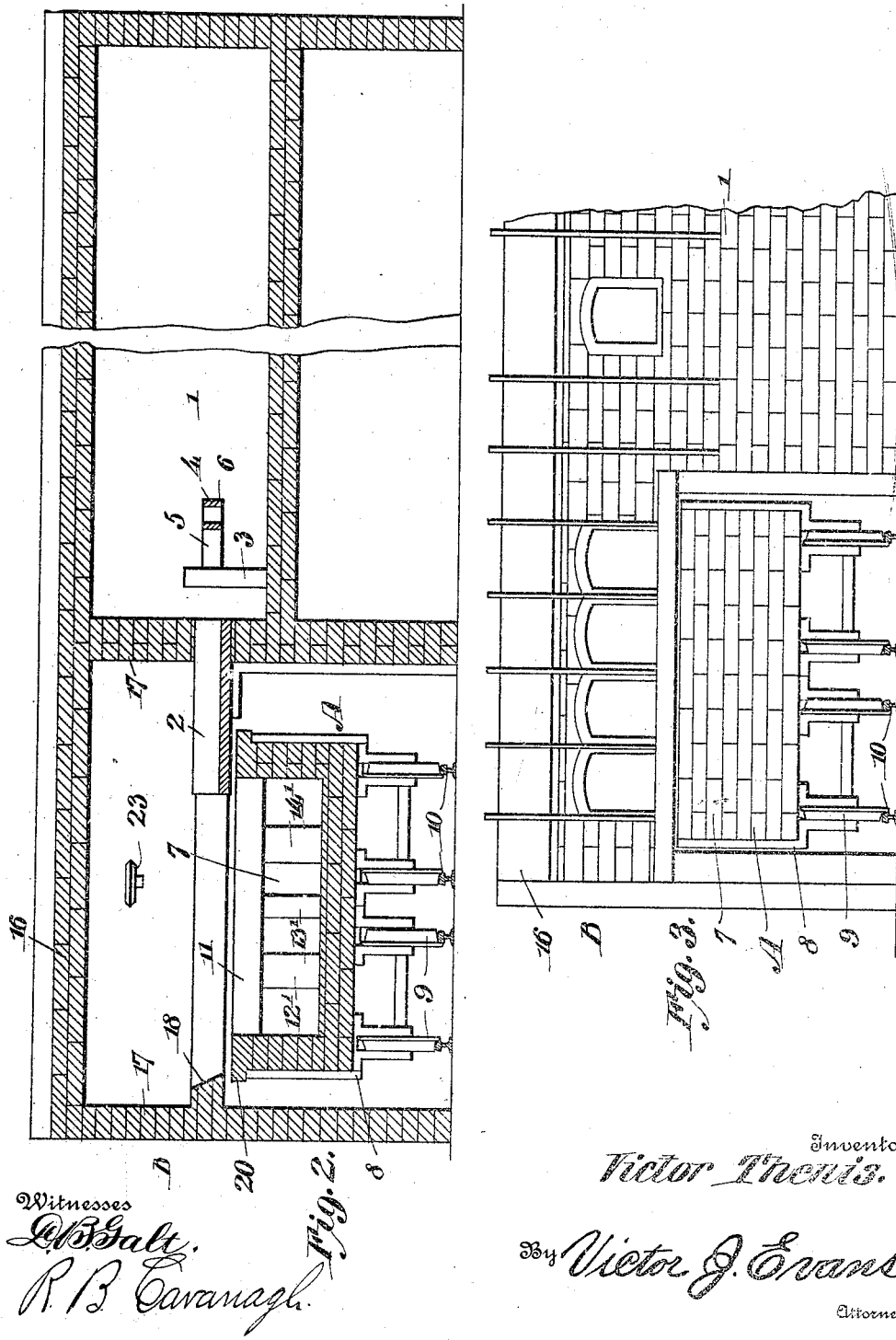

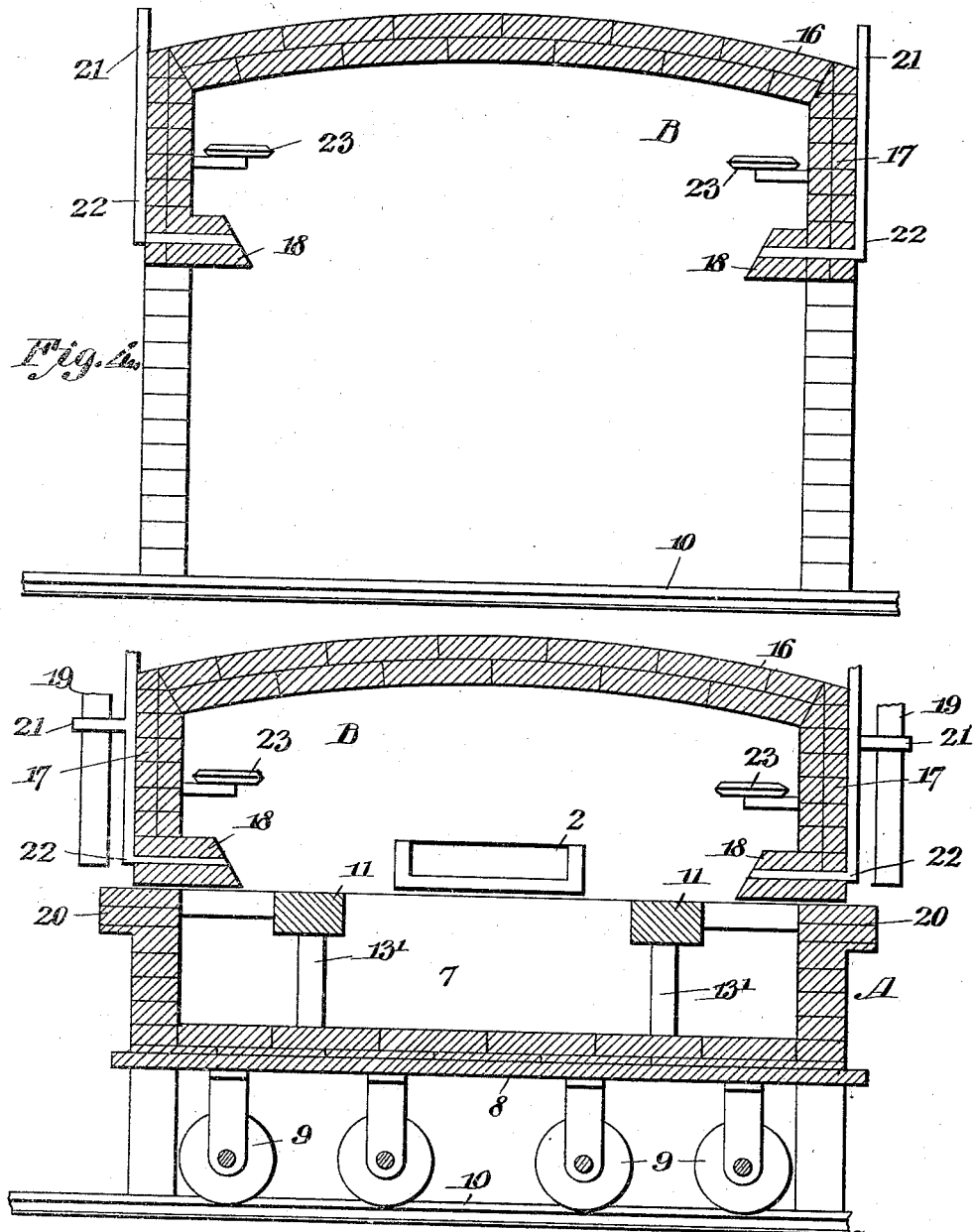

UNITED STATES PATENT OFFICE.

VICTOR THENIS, OF POINT MARION, PENNSYLVANIA.

GLASS-FURNACE.

1,027,933. Specification of Letters Patent. Patented May 28, 1912.

Application filed May 26, 1911. Serial No. 629,576.

*To all whom it may concern:*

Be it known that I, VICTOR THENIS, a citizen of the United States, residing at Point Marion, in the county of Fayette and State of Pennsylvania, have invented new and useful Improvements in Glass-Furnaces, of which the following is a specification.

The present invention relates to certain novel and useful improvements in glass working apparatus and has particular application to glass furnaces.

In carrying out my invention, it is my intention to provide a glass working apparatus wherein the molten glass may be drawn from a main tank into a movable, supplementary tank from which it may be taken by the workmen, such glass as it comes from the supplemental tank being clear and clean, devoid of dirt, sediment or other injurious substances. By my improved tank, I am enabled to obtain a better and higher class of glass.

Still a further object of my invention is to provide a construction of glass working apparatus, by means of which the mass may be properly heated to bring it to a molten state, and then directed to the movable tank, provided with a number of compartments from which the glass may be taken by a number of workmen, simultaneously. Thus, I accomplish a saving of time and labor, and, consequently, a great reduction in the cost of manufacture of the glass.

With the above-recited objects and others of a similar nature in view, the invention consists in the construction, combination and arrangement of parts, falling within and set forth in the appended claims.

In the accompanying drawings:—Figure 1 is a horizontal sectional view of the glass apparatus embodying my improvements, said view illustrating the main tank and the supplemental tank. Fig. 2 is a vertical sectional view taken on the line 2—2 of Fig. 1. Fig. 3 is a view in side elevation of the overlying housing for the supplemental tank. Fig. 4 is a transverse vertical sectional view taken through the housing or roofing of the supplemental tank. Fig. 5 is a sectional view of the movable tank and its overlying hood and the drawing apparatus in drawing the glass from the compartments of the tank.

Referring to the accompanying drawings in detail, the numeral 1 designates the main chamber in which the glass is melted, said tank being of any suitable shape and is provided with a conduit 2 leading from one end thereof to the movable tank A. In the construction of my improved apparatus, the main or stationary tank is relatively larger than the movable tank and is mounted above the latter so that the molten mass may flow by gravity into the movable tank. Within the stationary tank are the shoulders or ribs 3—3 against which bear the ends of the floating bridge 4, said bridge being composed of two end members 5 and the central member 6, all made of fire-proof material. This bridge floats on the molten mass, the clean, pure glass floating under the bridge and through the conduit 2 into the tank A, while the impure glass scum is caught by the bridge. The movable tank A is of any suitable shape and form, preferably square and comprises a box-like body 7 composed of suitable material and mounted upon a platform 8 carried by the trucks or wheels 9 and travels on the trackway 10. The movable tank is provided with the parallel floating partitions or bridges 11—11, while the numerals 12, 13 and 14, indicate fire-proof partitions extending from the walls of the tank inward toward the center thereof, the ends of said partitions being provided with heads 12', 13' and 14', respectively, which fit into slots or keyways in the floating partitions 11 so that said floating bridges are guided in their vertical movement. The sides of the tank are also provided with shoulders which act as guides for the ends of the floating bridges 11. By such an arrangement, it will be seen that the tank is divided into a series of compartments or chambers, the clean molten glass floating from the conduit 2 to the central portion *a* of the movable tank and thence under the partitions 11 into the compartments formed by the partitions 12, 13 and 14.

The movable tank A is surrounded by a housing or casing B, and superposed over the tank is an arch-shaped roof or hood 16 resting upon the vertical walls 17. Arranged below the walls 17 are the inwardly projecting shelves 18 so arranged that when the truck and the movable furnace is shifted to one side so that the glass may be removed from the compartments at one side, through the medium of the bait apparatus 19, as is shown in Fig. 5, the flanges 20 at the opposide of the tank lying directly beneath the shelf 18 at such side, so that the heat will be maintained over the glass directly beneath the vaulted roof, while the heat will be cut off from the glass being drawn from the compartments beneath the bait apparatus. Likewise, when the truck is shifted to bring the tank directly beneath the vaulted roof, with the walls of the tank in alinement with the walls 17, all the glass in the tank will be exposed to the heat within the housing. It will also be seen that the tank may be shifted from side-to-side of the housing to bring the compartments at one side or the other into working position, as may be desired. It will further be noted that the bait or working apparatus 19 is arranged at both sides of the housing, so that the glass may be drawn from the compartments of both sides of the tank.

The numerals 21 and 22 designate means for supporting the drawing or baiting apparatus and also for reinforcing the horizontal shelves 18.

In case the molten glass floating from the main tank should not contain sufficient heat to maintain the clean glass within the movable tank at the desired degree of plasticity, I provide the housing of the movable or supplemental tank with gas burners or other suitable heaters, preferably two in number as shown at 23, in Fig. 5, said heaters being arranged adjacent to the vaulted roof and communicating with the housing so that the heat therefor may be brought into contact with the mass of glass in the tank when the latter is directly beneath the roof within the housing.

From the above description, taken in connection with the accompanying drawings, the construction and manner of employing my improved apparatus will be readily apparent to those skilled in the art. The material is first reduced to a molten mass within the main tank, and the clean glass permitted to float beneath the bridge 4 and conduit 2 into the supplemental tank as heretofore described, the latter being mounted upon rollers and may be shifted from one side to the other of the vaulted roof of the movable tank and may be accessible to the workmen, so that the process of working the glass may be performed continuously.

It will be noted that I have provided a simple, efficient and effective method of apparatus for manufacturing glass, and one which will involve considerable saving over the apparatus now in use, while I have herein shown and described one particular embodiment of my invention by way of illustration, and I wish it to be understood that I do not confine myself to all the precise details of construction herein set forth as modification and variation may be made without departing from the spirit of the invention or exceeding the scope of the claims.

Having thus described the invention, I claim:—

1. The combination with a main tank, of a housing arranged adjacent thereto, a roof for the housing, a movable tank arranged within the housing, a conduit leading from the main tank to the movable tank, and a plurality of glass compartments at each side of the movable tank and formed partially of vertically movable floating walls, said movable tank being movable relative to the roof to bring the compartments into position for drawing the glass therefrom.

2. In a glass furnace, the combination of a main tank, a movable tank, a conduit connecting the main tank and the movable tank, a roof designed to extend over the movable tank, a plurality of compartments formed at the sides of the movable tank, the compartments on the same side of said movable tank having a common movable wall, drawing apparatus arranged outside the roof, said movable tank being designed to be shifted from side to side of the roof to bring the compartments under the drawing apparatus at predetermined times.

3. In a glass furnace, the combination with a main tank for the molten glass, of a movable tank arranged adjacent thereto, a conduit leading from the main tank to the movable tank, a plurality of partitions extending inward of the movable tank from the side walls thereof, floating walls at the inner ends of said partitions, said walls and partitions forming compartments for the glass at the sides of the movable tank, a roof extending over said movable tank, depending walls leading from said roof, shelves extending inward from the depending walls, glass drawing apparatus, and means whereby the movable tank may be moved from side to side to bring the compartments thereof beneath the drawing apparatus at predetermined times.

4. In a glass furnace, the combination of a main tank having a floating bridge therein, a movable tank, a conduit connecting the main tank and the movable tank, a plurality of compartments formed at the sides of the movable tank, the compartments on the same side of such movable tank having a common movable vertical wall, a roof extending over the movable tank, glass drawing apparatus adapted to take the glass from the compartments of the movable tank when the latter is moved to bring said compartments beneath the said glass drawing apparatus, and means for heating the glass in the movable tank.

5. In a glass furnace, the combination of a main tank, and a movable tank arranged adjacent thereto, a conduit leading from the main tank to the movable tank, said movable tank having a plurality of vertically arranged slots extending across the same in parallelism and spaced apart from the sides of the movable tank, whereby compartments are formed at opposite sides of said movable tank, the glass flowing from the conduit passing first to the space formed at the center of the movable tank and flowing thence into the compartments at the sides of said movable tank.

In testimony whereof I affix my signature in presence of two witnesses.

VICTOR THENIS.

Witnesses:
  JOHN DE GARDEYN,
  AUGUSTA THENIS.